United States Patent [19]
Hartl

[11] 3,797,867
[45] Mar. 19, 1974

[54] PNEUMATIC VEHICLE SANDING APPARATUS

[76] Inventor: John J. Hartl, 2200 Second St., S.W., Cedar Rapids, Iowa 52404

[22] Filed: June 7, 1972

[21] Appl. No.: 260,659

[52] U.S. Cl.................... 291/3, 291/11 R, 291/38
[51] Int. Cl... B60b 39/08, B60b 39/10, B61c 15/10
[58] Field of Search.................. 291/3, 11 R, 38

[56] References Cited
UNITED STATES PATENTS

| | | | |
|---|---|---|---|
| 1,516,211 | 11/1924 | Saunders | 291/11 R |
| 655,305 | 8/1900 | Mudd | 291/3 |
| 2,207,169 | 7/1940 | Todd | 291/3 |
| 3,606,420 | 9/1971 | Hultstrom et al | 291/3 |

*Primary Examiner*—Robert G. Sheridan
*Assistant Examiner*—Howard Beltran

[57] ABSTRACT

A semi-automatic pneumatic sanding apparatus for use in vehicles to spread sand on slippery road surfaces and thereby increase vehicle traction. The operation of the sander is controlled by the vehicle driver from the driver's compartment. The sander includes a fan to create an air stream which is used as the conveying medium to move the sand from a storage bin onto the road surface just ahead of the vehicle drive wheels.

5 Claims, 4 Drawing Figures

PATENTED MAR 19 1974 3,797,867

PNEUMATIC VEHICLE SANDING APPARATUS

BACKGROUND OF THE INVENTION

In certain parts of the country during winter, drivers of vehicles face the annual problem of icy or slippery roads. Road surfaces which become coated with ice or snow not only create a safety hazard but slight inclines in the road can become impassable by vehicles unless they are provided with some means of increasing the friction between the vehicle tires and the road surface. Many vehicles are provided with snow tires which are a great aid in snow but are of little value on icy road surfaces. The addition of steel studs to snow tires greatly improves the traction of a vehicle both in snow and on ice. However, studded tires are outlawed in some states, and in states where such tires are permitted, indications of increased wear on the road surfaces caused by studded tires may eventually lead to laws prohibiting their use. Tire chains are, of course, quite effective in both snow and on ice but are not widely used because of the inconvenience of their installation and removal and because they provide an extremely uncomfortable and noisy ride.

In most areas, street and road crews are prepared to spread sand and salt mixtures on streets and highways within a reasonable time after they become slippery due to ice or snow. Many times, however, drivers must travel roads or streets prior to sanding by the street and road crews. If a vehicle is not equipped with chains or with snow tires, plain or studded, the driver may find himself stranded or involved in an accident because of his inability to move or stop on a slippery road surface. There is, therefore, a need for a simple inexpensive and convenient means for increasing the traction of a vehicle so that it can be controllibly moved or stopped on a slippery road surface. Ideally, such means should be designed so that it can be used only when needed, and it should be inexpensive and convenient for the driver to use and maintain. It is the principal object of my invention to provide such a means in the form of a sanding apparatus which will quickly, conveniently and easily apply sand or other like substance to the road surface ahead of the drive wheels of the vehicle, thereby permitting movement of the vehicle to be controlled on a slippery road surface.

SUMMARY OF THE INVENTION

My invention is for a device which can be easily and conveniently added to a vehicle as an accessory and which will cause sand or other like material to be spread on the road surface just ahead of the drive wheels. This is accomplished by utilizing a fan to create an air stream which will serve as the conveying medium to pick up sand from a storage bin and convey it onto the road surface. The operation of the fan is preferably controlled by the operator, or it may also be controlled automatically by operation of the braking system, for example. The storage bin for the sand is located close to the drive wheels and because of its weight would also serve to increase the traction between the vehicle wheels and the road surface.

DESCRIPTION OF THE PREFERRED EMBODIMENT OF THE INVENTION

Figure 1:
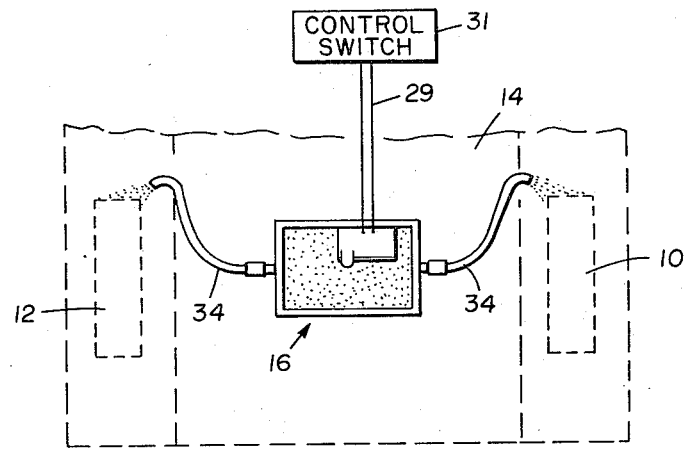
FIG. 1 is a top or plan view of a portion of a vehicle and showing the device of the invention positioned close to the vehicle drive wheels.
Figure 2:
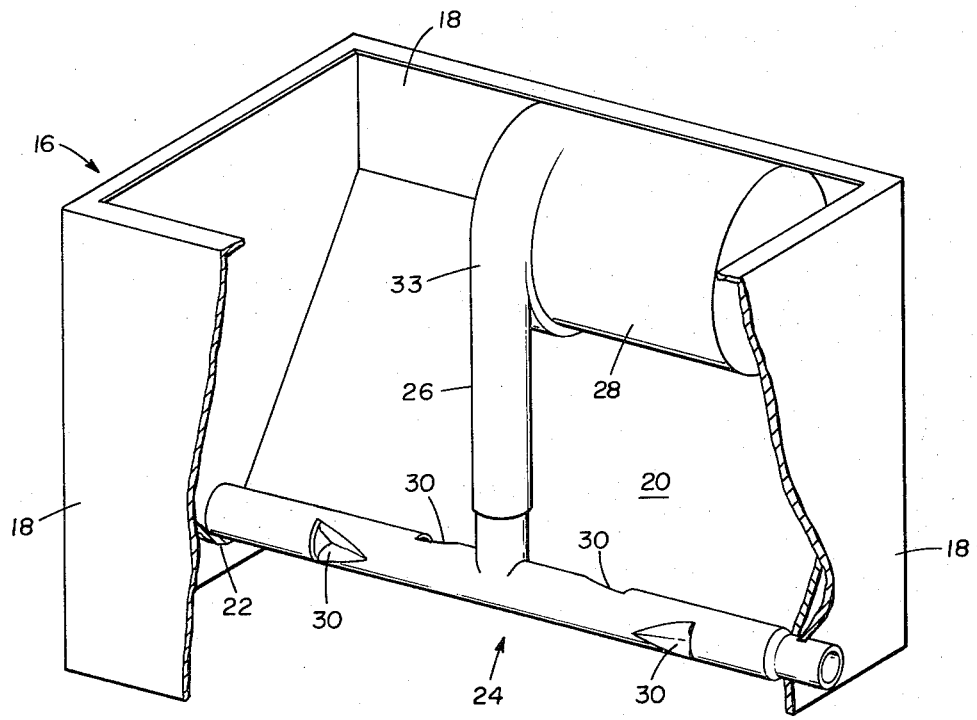
FIG. 2 is a prospective view of the storage bin portion of the device with part of the bin broken away to show the air conveying system.
Figure 3:
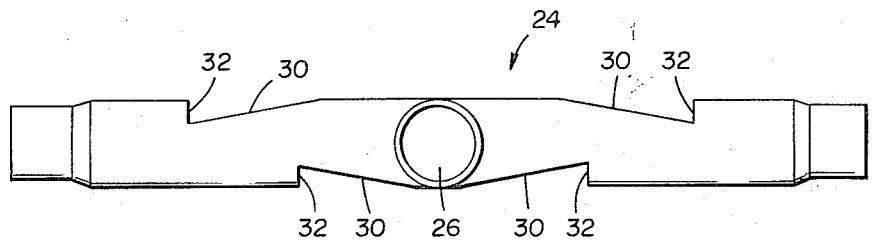
FIG. 3 is a top or plan view of the manifold portion of the air conveying system.

In FIG. 1 there is shown in dotted lines an outline representing that portion of a vehicle body around the drive wheels of the vehicle. As is well known to those skilled in the art, a vehicle has a right drive wheel 10 and a left drive wheel 12 which engage a road surface (not shown) and are driven by a power plant (not shown) connected to the drive wheels through a drive train (not shown). The vehicle drive wheels 10 and 12 may, of course, be single drive wheels or they may be multiple drive wheels in the case of a larger vehicle such as a truck. Also, the drive wheels 10 and 12 may be located in either the rear or the front of the vehicle. In either case, the vehicle normally has near the drive wheels 10 and 12 a storage area 14 which in the case of a passenger vehicle is called the trunk. In the case of trucks, this may be the bed of a pick-up truck, etc. This storage area 14 provides a readily accessible place for a small storage bin 16 of any desired exterior shape or size into which there can be placed a quantity of sand or other like material that is to be spread upon the roadway to increase the vehicle's traction. The sand storage bin 16 preferably has side walls 18 which together with a bottom wall 20 provide an enclosure for storage of the sand. As best seen in FIG. 2 the bottom wall 20 is preferably sloped so as to provide a narrow trough 22 at the low point of the bottom wall 20. It should be understood that the bottom wall 20 might be somewhat V-shaped as shown in FIG. 2, or the trough 22 might be provided by merely sloping one of the side walls 18 toward the other. In any event, there is provided along the trough 22 of the bin 16 a conduit or manifold indicated generally by the reference numeral 24. The center of manifold 24 is connected by a hollow tube 26 to a fan-motor unit 28, and the ends of manifold 24 extend through opposite side walls 18. The unit 28 can be of any suitable design in which a rotating fan blade is driven by a motor, preferably one that is electrically powered by the electrical system of the vehicle. The fanmotor unit 28 is connected by suitable wires 29 to the electrical system of the vehicle which would include a control button or switch 31 located in the driver's compartment of the vehicle. The control button or switch 31 is operated by the driver of the vehicle to stop or start the fan-motor unit 28. The tube 26 is connected to the air discharge port 33 of unit 28 so that when the unit 28 is running pressurized air will be blown through the tube 26 into the manifold 24. Manifold 24 contains a plurality of openings 30 preferably located along the sides of the manifold. Each opening 30 is formed by making a circumferential cut in the manifold 24 and then deforming that portion of the manifold adjacent to the cut inwardly to a predetermined depth. This provides an opening into the manifold with the portion 32 of the wall of the manifold leading to the opening 30 being at an angle to the central axis of the manifold 24. This angle preferably should be not more than 15°. The purpose of forming the openings 30 in this manner is to avoid plugging of the manifold 24 and allow free flow of the sand stored in the bin 16 into the manifold 24 whenever pressurized air is blown through the manifold 24 from the fan-motor unit 28.

Because of the design of the openings 30, air flowing through the manifold 24 will create a suction effect near the openings 30 and pull the sand into the interior of the manifold 24 from where it is carried by the air stream through outlet tubes 34 from which the sand is discharged just ahead of the drive wheels 10 and 12. This is best seen in FIG. 1 of the drawings. Both the design and location of the openings 30 is somewhat critical to avoid clogging of the manifold 24. When the bin 16 is filled with sand, gravity will tend to force sand into the inside of the manifold 24. If a sufficient amount of sand is thus forced into the manifold 24 the force of the air flowing through manifold 24 may be insufficient to blow the sand out through the discharge tubes 34 and clogging will result. When clogging results, the unit, of course, becomes ineffective. With the design of the openings 30 as shown in the drawings and described herein, clogging is avoided, and a free flow of sand is provided by the suction effect created near the openings 30 when the fan unit 28 is running. There is normally sufficient turbulence created by movement of the air through manifold 24 to keep the sand in the bin 16 flowing downwardly into the trough 22 where the manifold 24 is located.

Figure 4:
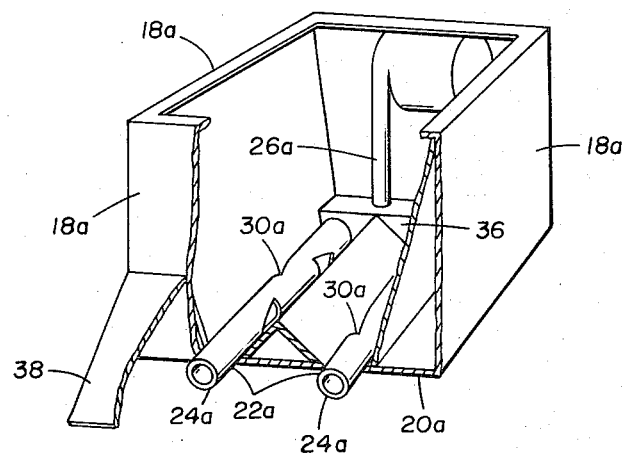
FIG. 4 is a perspective view of another embodiment of the invention.

In FIG. 4, I have shown another embodiment of my invention using a dual manifold arrangement. Parts of the second embodiment corresponding to those in the first embodiment will be referred to with the same reference numeral followed by the reference letter "a." Thus, the device of this second embodiment includes a fan-motor unit 28a mounted at the top of a bin 16a having side walls 18a. The fan-motor unit 28a is connected by a tube 26a to a distribution manifold 36 which contains no openings except those leading to a pair of manifolds 24a similar to those shown in the first embodiment. Each manifold 24a has a plurality of openings 30a identical to openings 30 of the first embodiment. Each of the manifolds 24a is located in a trough 22a along the bottom wall 20a of the bin 16a. In the second embodiment, however, because there are two manifolds 24a the floor 20a is formed in a somewhat "W" shaped cross-section to provide two troughs 22a one for each of the manifolds 24a. One end of each of the manifolds 24a extends through a side wall 18a which has on its exterior a baffle 38 the purpose of which is to deflect the sand discharged from manifolds 24a downwardly toward the road surface. The unit of the second embodiment is, therefore, designed for situations in which there is insufficient room inside of a trunk or other storage area of the vehicle but in which there is sufficient room in the wheel well to mount the entire unit. In operation, the device of the second embodiment is similar in all respects to that of the first embodiment.

From the foregoing description, it will be evident that I have designed a means controlled by the vehicle operator to distribute sand unto the roadway surface just ahead of the vehicle drive wheels. Because of the unique design of my device, it will provide a reliable clog-free arrangement for distributing the sand without the necessity of the vehicle operator doing anything other than merely pushing the control button or switch.

If desired, the control switch could be combined with the braking system of the vehicle so that the fan would be started automatically when the brakes of the vehicle were applied. In such a case, it would be desirable of course to also allow control from the driver's compartment so that the device could be used to improve traction not only when the vehicle is stopping but when it is moving up an incline and cannot gain sufficient traction. The manifold design of the invention permits a very low power fan to be used thus keeping the cost of the device to a minimum. The cost of the device is such that it is readily available to practically any vehicle owner or operator and will more than pay for itself if it saves the driver from a single accident or from being stranded a single time.

Although I have described my invention in connection with preferred embodiments thereof, it will be obvious to those skilled in the art that various revisions and modifications can be made therein without departing from the spirit or scope of the invention. It is my intention, however, that all such revisions and modifications as are obvious to those skilled in the art will be included within the scope of the following claims.

I claim:

1. A motor-vehicle mounted apparatus for distributing sand and the like onto a road surface ahead of the drive wheels of the vehicle, said apparatus comprising storage means for containing a supply of sand, an enclosed duct positioned in said storage means beneath the sand contained therein and providing a passageway, said duct having inlet and discharge openings with the discharge opening being outside said storage means, said duct having a plurality of inlet openings spaced along the portion of said duct inside of said storage means, said inlet openings being located along a side of said duct with each of said openings being a notch where the side of the duct extends into said passageway and forms a constriction in the upstream direction, a power operated fan having an air discharge opening connected to the inlet of said duct for causing air to flow through said duct at a sufficient velocity to create a suction effect at the location of each of said openings to there-by move sand from said storage means through said openings into said duct and then through said duct to the discharge open-ing thereof, a control switch operatively connected to said fan and operable by the vehicle operator to start and stop said fan, and means connected to the discharge end of said duct for directing the sand to a place ahead of said drive wheels.

2. The apparatus of claim 1 in which said storage means has a bottom wall that is sloped, and said duct is positioned at the lowest level of said bottom wall.

3. The apparatus of claim 1 in which said duct extends through said storage means and to the outside thereof in opposite directions, and said duct is connected near its center to said fan, there being inlet openings in said duct on each side of said connection.

4. The apparatus of claim 1 in which there are two ducts, and a distribution manifold connects said ducts to said fan, both of said ducts being located along the bottom wall of said storage means.

5. The apparatus of claim 4 in which the bottom wall of said storage means is somewhat W-shaped in cross section and one of said ducts is located in each of the two low points of said bottom wall.

* * * * *